United States Patent [19]

Enari

[11] Patent Number: 5,307,160
[45] Date of Patent: Apr. 26, 1994

[54] APPARATUS FOR STILL IMAGE REPRODUCTION WHICH INCLUDES PLURAL IMAGE BUSSES

[75] Inventor: Masahiko Enari, Yokohama, Japan

[73] Assignee: Canon Kabushiki Kaisha, Tokyo, Japan

[21] Appl. No.: 942,329

[22] Filed: Sep. 9, 1992

Related U.S. Application Data

[63] Continuation of Ser. No. 548,834, Jul. 6, 1990, abandoned.

[30] Foreign Application Priority Data

Jul. 6, 1989 [JP] Japan ................................ 1-174964

[51] Int. Cl.⁵ ........................ H04N 1/46; H04N 1/41
[52] U.S. Cl. ................................ 358/500; 358/426; 358/444
[58] Field of Search ............... 358/22, 75, 426, 444; 340/799; H04N 1/46, 1/41

[56] References Cited

U.S. PATENT DOCUMENTS

| | | | |
|---|---|---|---|
| 4,841,367 | 6/1989 | Ichikawa et al. | 358/181 |
| 4,868,659 | 9/1989 | Modesitt | 358/148 |
| 4,930,014 | 5/1990 | Maeda et al. | 358/909 |
| 4,996,598 | 2/1991 | Hara | 358/22 X |
| 5,067,017 | 11/1991 | Zucker | 358/142 |

FOREIGN PATENT DOCUMENTS

| | | |
|---|---|---|
| 3826643 | 6/1989 | Fed. Rep. of Germany. |
| 56-56079 | 5/1981 | Japan ................................ 358/147 |

OTHER PUBLICATIONS

Takahashi, "Digital HDTV Disc System", I.E.E.E. Transactions on Consumer Electronics, vol. 34, No. 1 (Feb. 1988).

*Primary Examiner*—Mark R. Powell
*Attorney, Agent, or Firm*—Fitzpatrick, Cella, Harper & Scinto

[57] ABSTRACT

A dual image bus image reproduction apparatus is disclosed, which comprises an image memory capable of storing at least one frame of an image signal, a reproduction processor for performing reproduction processing of the input image signal and a controller for controlling the reproduction processor for a predetermined period of time beginning with the connection of the power source to allow a predetermined signal be provided from the reproduction processor.

10 Claims, 4 Drawing Sheets

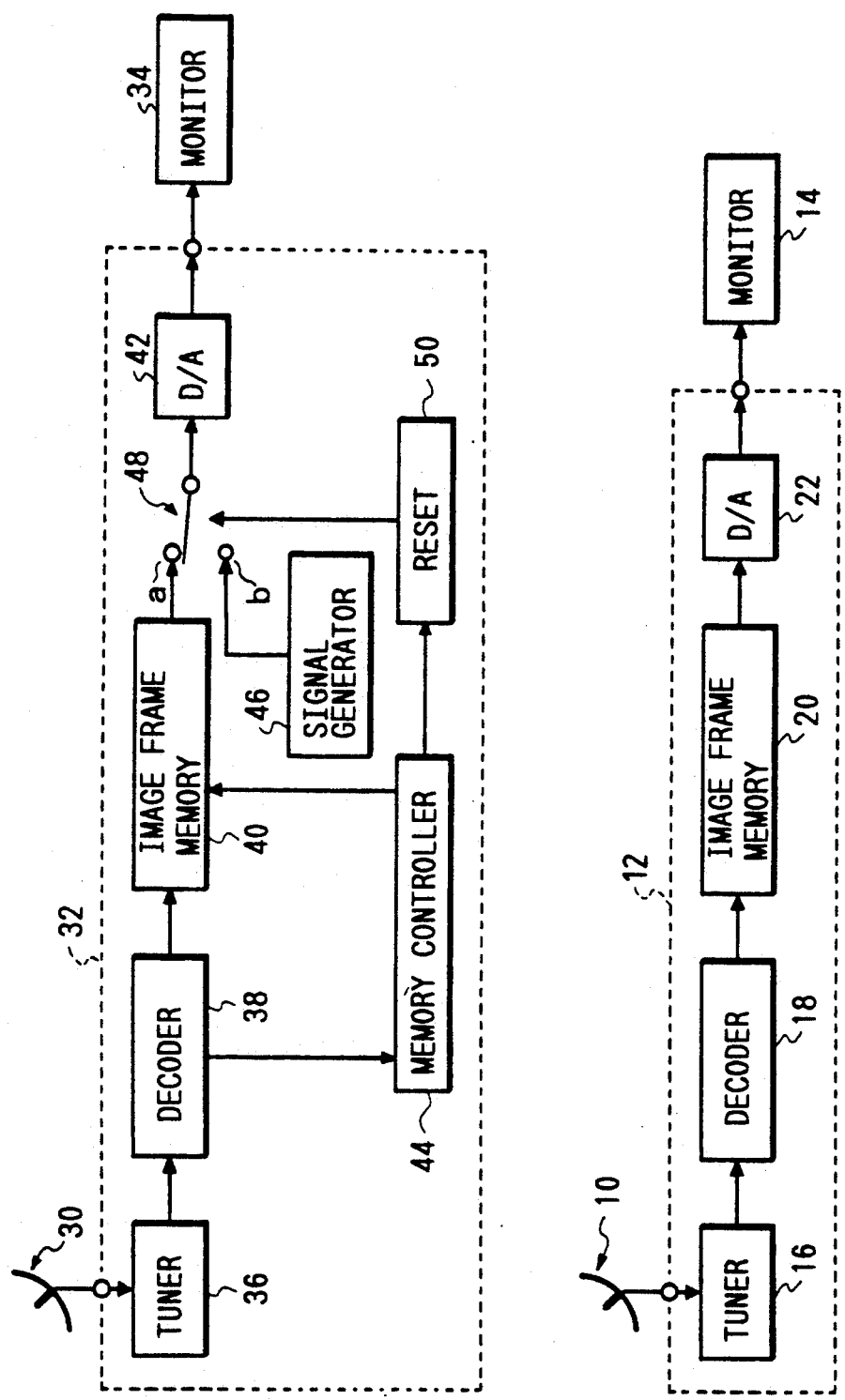

APPARATUS FOR STILL IMAGE REPRODUCTION WHICH INCLUDES PLURAL IMAGE BUSSES

This application is a continuation of application Ser. No. 07/548,834 filed Jul. 6, 1990, now abandoned.

BACKGROUND OF THE INVENTION

1. Field of the Invention

This invention relates to an apparatus for reproducing still images and, more particularly, to an apparatus for duplicatingly reproducing still images from a signal received from a broadcasting system, for instance.

2. Related Background Art

Recently proposed broadcast television systems intended for practical use, aside from the conventional NTSC system with an aspect ratio of 3:4 and a scanning for instance a HDTV system with an aspect ratio of 9:16 and a scanning line number of 1,125. The HDTV system can deal with about 5 times the image data quantity compared to the NTSC system and also uses a wide screen. Thus, it permits enjoyment of images which are dense and rich in the on-the-spot sense.

However, data quantity has been increased to such an extent that it can not be directly transmitted to each home due to limitations imposed on the broadcast waves and communication capacity. Therefore, bandwidth compression is adopted for transmission on the basis of commonly termed distribution quality, which is slightly inferior to the intrinsic image quality obtained in studio. Table 1 shows an example of specifications concerning the in-studio quality and distribution quality in the HDTV system.

TABLE 1

|                                   | In-studio quality | Distribution quality |
|-----------------------------------|-------------------|----------------------|
| Scanning line number              | 1,125             | 1,125                |
| Brightness bandwidth (Y)          | 30 MHz            | 20 MHz               |
| Brightness sampling frequency     | 74.25 MHz         | 48.6 MHz             |
| Chromatic difference Bandwidth    | 15 MHz            | 7 MHz                |
| Chromatic difference sampling frequency | 37.125 MHz  | 16.2 MHz             |

It is thus inevitable to provide distribution quality for home enjoyment of HDTV system image as motion image.

In the mean time, with the HDTV system the scanning line number is large, and image is dense and less subject to flickering. For this reason, the HDTV system image is enjoyable as still image rather than motion image, and utilization of the HDTV system in the fields of art, culture, education and animation has been expected. In the case of still image, the observer looks at one frame of image thoroughly for several seconds. For this reason, in-studio quality is required as the image quality.

Accordingly, a HDTV still image reproduction apparatus permitting enjoyment of in-studio quality is proposed separately from the HDTV motion image reproduction apparatus. FIG. 2 shows a block diagram of a prior art example of the structure. Reference numeral 10 designates an antenna for intercepting waves transmitted from a broadcasting satellite, 12 a HDTV still image reproduction apparatus, 14 a HDTV color monitor for displaying images with 1,125 scanning lines. In the still image reproduction apparatus, reference numeral 6 designates a tuner for converting waves received by antenna 10 into still image digital compression data, 18 a decoder for decoding still image digital compression data obtained by, for instance, bandwidth compression in a DPCM process, into original image data, 20 an image frame memory for storing one frame of decoded image data from decoder 18, and 22 a D/A converter for converting image data read out from image frame memory 20 into analog signal.

As to the transmission rate, since one still image frame is observed for at least in several seconds, it is usually about 2 Mbps for saving for transmission bandwidth (here bit rate of transmission).

In the prior art system, image data is transmitted unilaterally from the transmission side (for instance from a broadcast satellite). When connecting the power source of the still image reproduction apparatus, an indefinite pattern is displayed on monitor 14 until complete image data of the first frame is stored in image frame memory 20. The indefinite pattern is uncomfortable and is continued for at least several seconds.

SUMMARY OF THE INVENTION

An object of the invention is to provide an image reproduction apparatus, which is free from generation of an uncomfortable pattern.

To attain this object of the invention, there is provided as a preferred embodiment thereof an image reproduction apparatus, which comprises image memory means capable of storing at least one frame of an image signal, reproduction processing means for performing reproduction processing of the input signal and control means for controlling the reproduction processing means for a predetermined period of time from the connection of the power source to let a predetermined signal be provided from the reproduction processing means.

Another object of the invention is to provide an apparatus, which permits the above advantages to be obtained with a simple construction.

The above and other objects and features of the invention will become more apparent from the following description of embodiments with reference to the drawings.

BRIEF DESCRIPTION OF THE DRAWINGS

FIG. 1 is a block diagram showing one embodiment of the invention;

FIG. 2 is a block diagram showing a prior art system;

DETAILED DESCRIPTION OF THE PREFERRED EMBODIMENTS

Figure 3:
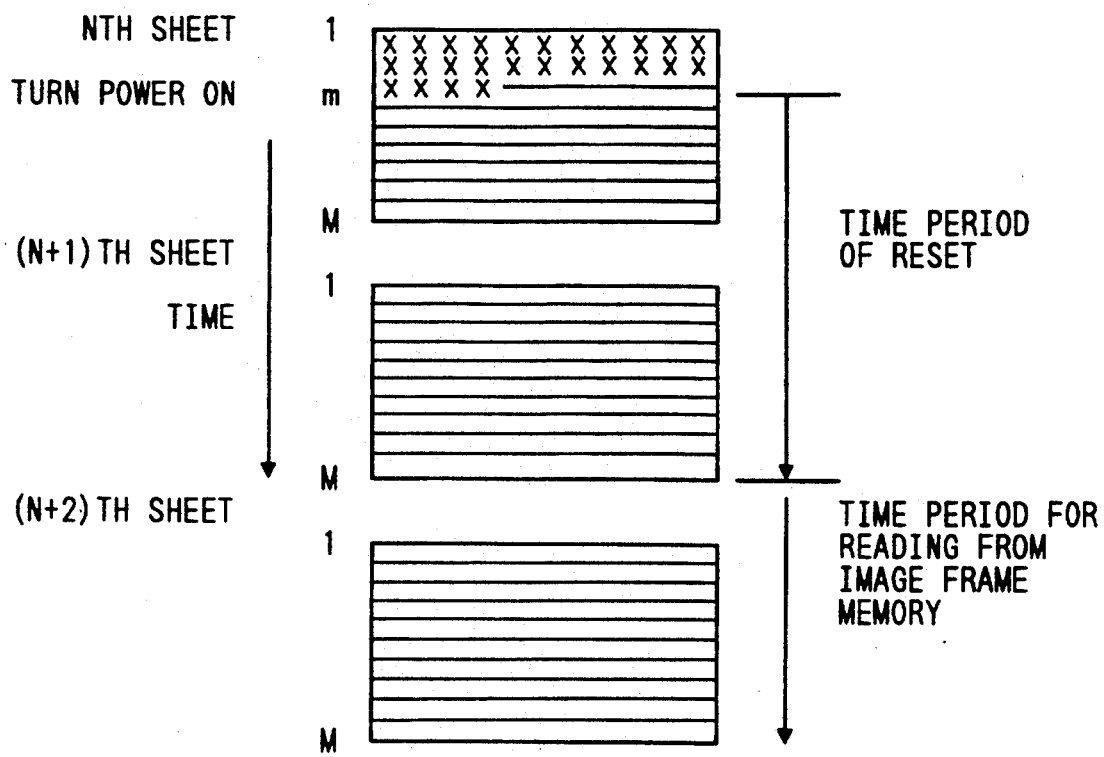
FIG. 3 is a view for explaining the relation between memory operation and output suppression in the same embodiment.

Now, embodiments of the invention will be described with reference to the drawings.

FIG. 1 is a block diagram showing one embodiment of the invention. Reference numeral 30 designates an antenna, 32 a still image reproduction apparatus of this embodiment, and 34 a monitor like monitor 14 shown in FIG. 2. In the still image reproduction apparatus 32, reference numeral 36 designates a tuner for converting waves intercepted by antenna 30 into still image digital compression data, 38 a decoder for decoding still image digital compression data, compressed by sampling and DPCM process, into original image data, 40 an image frame memory for storing one frame of decoded image data from decoder 38, 42 a D/A converter for converting image data read out from image frame memory 40 into analog signal, 44 a memory controller for controlling write addresses of memory 40 according to a signal indicative of the status of progress of decoding in decoder 38, 46 a signal generator for generating a predetermined image signal, 48 a selection switch for selecting either output of memory 40 or output of signal generator 46, and 50 a reset circuit operative at the time of connection of the power source to control switch 48 according to the status of writing in memory 40.

In this embodiment, the effective scanning line number is 1,035, the effective pixel number of one scanning line of brightness signal (Y) is 1,920, the effective pixel number of one scanning line of chromatic difference signal (Pr, Pb) is 920, and chromatic difference signal is transmitted as chromatic difference line sequential signal obtained after thinning out every other scanning line. Thus, the bit number of each frame, with one pixel assumed to be of an 8-bit PCM value, is $$\{1{,}035 \times 1{,}920 + (1{,}035/2) \times 960 \times 2\} \times 8 = 23.846M$$

These bits are thinned out in a checkerboard fashion by off-set sampling, and this off-set sampling is combined with a DPCM process of compression to 4 bits per pixel, and in this way the amount of transmitted data is compressed to one-fourth. Thus, the bit number of one frame is 23.8464M divided by 5.9, i.e., 616M. To this data quantity are added sink code and other redundant bits necessary for transmission to provide a transmission rate of about 2Mbits/sec. in an actual practice example. In this case, it takes about 3 seconds or more until one frame data is completely written in image frame memory 40.

When the power source is connected, memory controller 44 causes sequential writing of decoded data from decoder 38 in image frame memory 40 from the corresponding address position and also causes sequential reading of stored data in memory 40. At the moment of connection of the power source unstable data is stored in memory 40. Therefore, data read out from memory 40 produces an uncomfortable indefinite pattern display which is continued for about three seconds.

In this embodiment, reset circuit 50 monitors the status of writing of data in memory 40 and has switch 48 held connected to the side of the b contact for a period of time from the instant of connection of the power source till completion of one frame image data in memory 40 (the period being referred to as reset period). Thus, during the reset period a signal generated from a signal generator 46 is applied to D/A converter 42 to obtain display of its image on monitor 34. When the reset period noted above has passed, reset circuit 50 switches switch 48 to the side of a contact. As a result, received image data stored in image frame memory 40 is applied to D/A converter 42 to obtain a display of received image on monitor 34.

Regarding the signal provided from signal generator 46, as for brightness signal, for instance, white peak level (240 for 8 bits) is outputted, and as for chromatic difference signal, blanking level (120 for 8 bits) is outputted. In this case, during the reset period whole white is displayed on the screen of color monitor 34. Of course, it is possible to provide other colors.

Further, it is possible to use a character generator as signal generator 46 and cause display of a predetermined message consisting of characters and drawings on monitor 34 during the reset period. If the message is of a simple pattern, only a very small memory capacity is needed for it.

Now, a method of detecting the reset period will be described with reference to FIG. 3. In the diagram of FIG. 1, time elapses as one goes down. It is assumed that the power source of still image reproduction apparatus of FIG. 1 is closed while an m-th line in an N-th frame is transmitted. Memory controller 44 one of M data blocks that is being received from the ID number attached to that data block and writes the received data, i.e., decoded data, in a corresponding memory position of memory 40.

Reset circuit 50 detects the write start position of memory 40 immediately after the power source connection. If this corresponds to the ID number of one of M data divisions, the image data of the N-th frame is incomplete. Subsequently, after the start of writing of 1-st data block of (N+1)-th frame in memory 40 and end of writing of M-th data block, this means that writing of image data of the (N+1)-th frame has been completed. Reset circuit 50, detecting this, switches switch 48 to the side of a contact.

Figure 4:
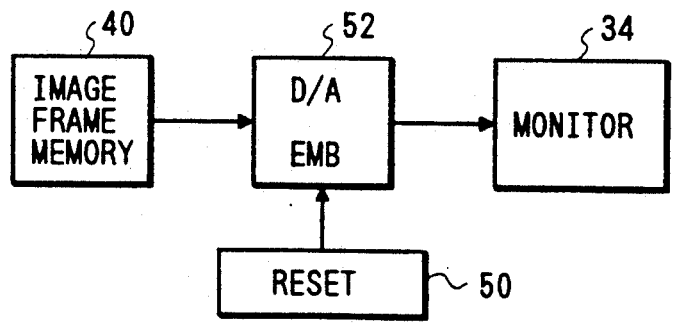
FIG. 4 is a block diagram showing a modification of the embodiment shown in FIG. 1.

FIG. 4 is a block diagram showing a part of a modification of the embodiment which can dispense with signal generator 46. In the Figure parts like those in FIG. 1 are designated by like reference numerals. In this modification, D/A converter having an enable terminal converts output data from image frame memory 40 into analog signal. The output of reset circuit 50 is supplied to the enable terminal, and during the reset period the output of D/A converter 52 is limited to a certain value. In this case, a mono-tone display is obtained on the screen of color monitor 34. As a further modification, it is possible to on-off control a buffer circuit (not shown), which is connected between D/A converter 42 or 52 and monitor 34, according to the output of reset circuit 50. Again in this case, a mono-tone display is obtained on the screen of color monitor 34.

Figure 5:
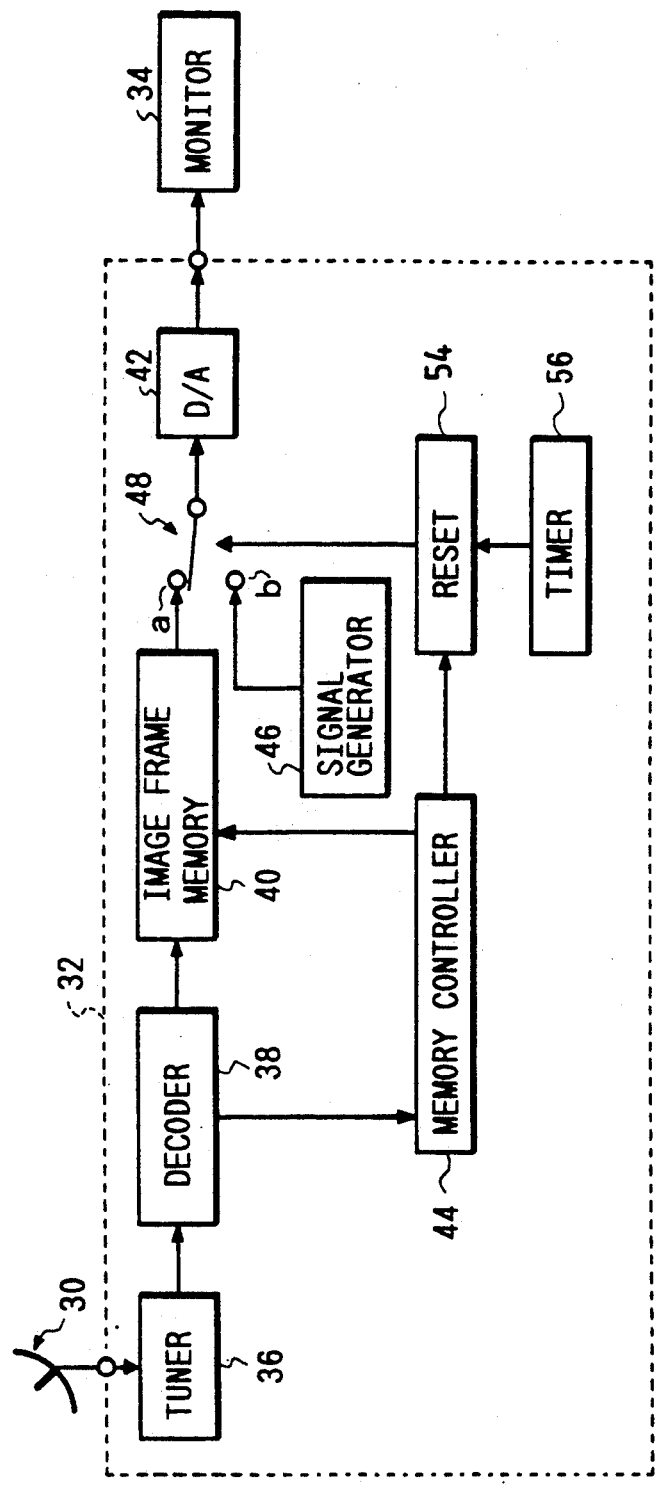
FIGS. 5 and 6 are block diagrams showing further modifications.

In the above instances, a check as to whether image data has been completely written in memory 40 is effected from the operating state of memory controller 44. However, since the transmission rate is known and constant, the same result of check can be known by calculation during a period from the instant of power source connection until perfect image data can be obtained. Thus, it is possible to switch 48 control D/A converter 52 or a buffer circuit (not shown) according to the lapse of this time period. FIG. 5 is a block diagram showing a further modification. In the Figure, parts like those in FIG. 1 are designated by like reference numerals. Initially, reset circuit 54 connects switch 48 to the side of b contact, and timer 56 starts to count time in response to the power source connection. When reset circuit 54 detects that the last data of one frame of image data, i.e., data of M-th data block (see FIG. 3), has been written in memory 40 by memory controller 44, it compares output T1 of timer 56 and time T2 required for the decoding of one frame of image data and writing thereof in memory 40. If it is found as a result of comparison that T1≧T2, reset circuit 54 switches switch 48 to the side of a contact to let the output of image frame memory 40 be supplied to D/A converter 42. If T1<T2, switch 48 is held connected to the side of b contact, and the next write end signal from memory controller 44 is awaited.

The invention is applicable as well to an apparatus having a plurality of image frame memories for receiving frame image data an while image signal of a different frame is transmitted. Further, the invention is applicable to a case where image data is transmitted without bandwidth compression in order to provide for higher image quality.

Further, while the above description has concerned the process of reproducing image data broadcast from a broadcast satellite, the invention is applicable not only to cases dealing with radio waves but also apparatus for reproducing images recorded on optical disks, opto-magnetic disks, magnetic tapes and other recording media.

It will be understood that with the above embodiment the memory output is suppressed or a predetermined signal is provided for a period of time from the instant of connection of the power source until one complete frame of image data is obtained, thus eliminating uncomfortable image output.

Figure 6:
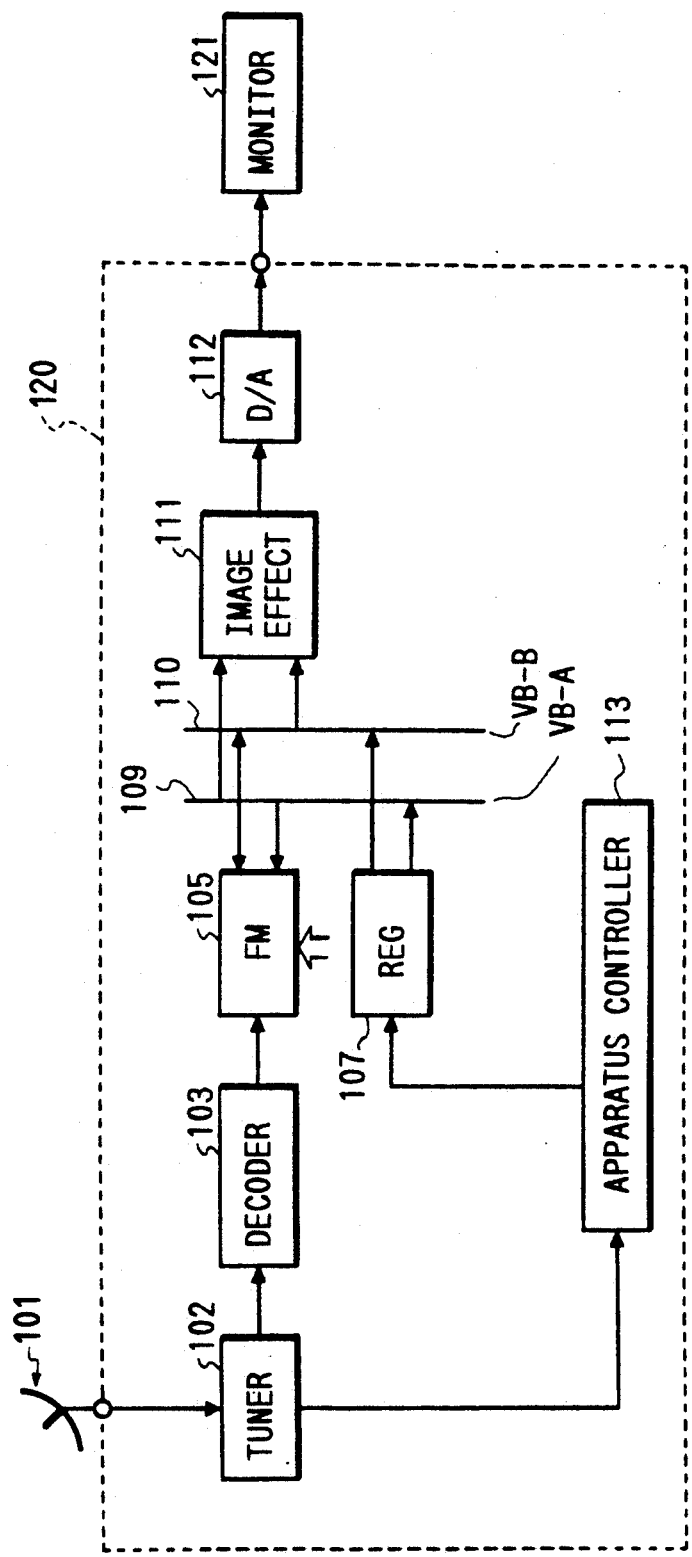

FIG. 6 is a block diagram showing a different embodiment of the invention. Referring to FIG. 6, reference numeral 101 designates an antenna for intercepting waves transmitted from a broadcast satellite, 120 the overall construction of this embodiment of an image receiving and reproducing apparatus, and 121 a HDTV color monitor for displaying images with 1,125 scanning lines. In this embodiment of the image receiving and reproducing apparatus 120, reference numeral 102 designates a tuner for connecting digitally compressed image data obtained from waves received by antenna 101 into apparatus control data, and 103 a decoder for decoding digitally compressed image data, obtained by bandwidth compression in DPCM process, into original image data. In this embodiment, a time interval of at least several ten seconds is required for receiving one still image frame. Reference numeral 105 designates an image frame memory for storing one frame of decoded image data from decoder 103. Image frame memory 105 is a multi-port random access memory, which is capable of writing data in random addresses and also entire asynchronous reading of data effectively at the frame rate. Reference numeral 107 designates a register for tentatively storing a single color as background color, for instance. The register consists of mere D flip-flops for several bits of brightness signal and chromatic difference signal. Reference numeral 109 designates a digital video bus VB-A for transmission of data at the frame rate, i.e., transmission of one frame of image data effectively in 1/30 second, 110 another digital video bus VB-B for transmission of data at the frame rate, 111 an image effect circuit for performing an image effect processing, for instance combining image data through both digital video buses VB-A 107 and VB-B 110 by appropriate calculation, 112 a D/A converter for converting image data read out from image effect circuit 111 into analog signal, and 113 an apparatus controller for controlling the writing and reading of data in and from image frame memory 105 to effect writing of mono-chromatic data as background color, for instance, in register REG-A 107.

In the case of an ordinary image, image data for writing in image frame memory 105 is written in an image frame memory, which is determined by apparatus controller 113 according to a write instruction generated by decoder 103 and received by tuner 102. In addition, apparatus controller 113 controls video buses 109 and 110 for supplying data thereto from image frame memory while effecting timewise control of read instruction received from tuner 102. Further, apparatus controller 113 provides various image effect execution commands to image effect circuit 111.

In case where a mono-chromatic data constitutes background color, apparatus controller 113 receives monochromatic data for the background color received from tuner 102 or data for producing monochromatic data for background color and writes this monochromatic data in register 107.

Further, monochromatic image data written in register 107 may be written in all areas of image frame memory 105 through either one of video buses VB-A 109 and VB-B 110 at the frame rate.

The operation of the embodiment having the above construction will now be described.

When the power source is connected, blue data, for instance, is written in register REG 107 in FIG. 6. This blue data written in the register is then transferred to image frame memory 105, and all the memories are cleared to blue data.

Subsequently, blue data written image frame memory 105 is displayed on monitor 121 through image effect circuit 111. Subsequently, image frame memory 105 is progressively re-written according to decoded image data from decoder 103.

It will be seen that uncomfortable display of noise on monitor 121 can be prevented with a simple construction. In other words, this embodiment is very simple in construction and is free from display of noise on monitor 121.

I claim:

1. An apparatus comprising:
   receiving means for receiving compressed image data;
   expansion means for expanding received compressed image data;
   a memory for storing the image data for one frame expanded by said expansion means;
   generation means for generating predetermined display image data;
   first means for connecting said memory, a first image bus, and a second image bus; and
   second means for connecting said generation means, said first image bus, and said second image bus;
   wherein said generation means writes the predetermined display image data in said memory through said first image bus.

2. An apparatus according to claim 1, wherein said image data comprises color image data.

3. An apparatus according to claim 1, further comprising third connection means for connecting either one of said first and second image buses to a monitor display system.

4. An apparatus according to claim 3, wherein said monitor display system includes means for combining expanded image data output through said first bus from said memory with predetermined display image data output through said second bus from said generation means.

5. An apparatus according to claim 1, further comprising timing means for timing a predetermined time period beginning with a turning on of a power source.

6. An apparatus according to claim 1, wherein said generation means comprises a register for latching the image data.

7. An apparatus comprising:
memory for storing one frame of image data received;
generation means for generating predetermined display data;
first and second image buses respectively connected to said memory and said generation means;
timer for timing a predetermined time period beginning with a turning on of a power source of said apparatus; and
means for supplying the predetermined display data generated by said generation means to a monitor through either one of said first and second image buses during the timing of the predetermined time period by said timer.

8. An apparatus according to claim 7, wherein said generation means generates monochromic display data.

9. An apparatus according to claim 7, wherein said generation means writes the predetermined display data in said memory through either one of said first and second image buses, and supplies the predetermined display data to said monitor from said memory.

10. An apparatus according to claim 7, wherein said image data comprises compressed image data and said apparatus further comprises means for expanding the compressed image data.

* * * * *

UNITED STATES PATENT AND TRADEMARK OFFICE
CERTIFICATE OF CORRECTION

PATENT NO. : 5,307,160
DATED : April 26, 1994
INVENTOR(S) : MASAHIKO ENARI

It is certified that error appears in the above-indentified patent and that said Letters Patent is hereby corrected as shown below:

On title page,

IN THE TITLE [54]:

"BUSSES" should read --BUSES--.

IN THE ABSTRACT [57]:

"be" should read --to be--.

COLUMN 1:

line 4, "BUSSES" should read --BUSES--;

line 18, "scanning" should read --scanning line number of 525, including those of finer resolution,--; and line 50, "mean time," should read --meantime,--.

COLUMN 2:

line 12, "in" should be deleted.

COLUMN 4:

line 39, "mono-tone" should read --monotone--.

UNITED STATES PATENT AND TRADEMARK OFFICE
CERTIFICATE OF CORRECTION

PATENT NO. : 5,307,160
DATED : April 26, 1994
INVENTOR(S) : MASAHIKO ENARI

It is certified that error appears in the above-indentified patent and that said Letters Patent is hereby corrected as shown below:

COLUMN 5:

line 7, "image" should read --an image--; and line 64, "mono-chromatic" should read --monochromatic--.

COLUMN 7:

line 5, "memory" should read --a memory--;

line 9, "means;" should read --means, each image bus having at least three of inputs and/or outputs;--; and line 10, "timer" should read --a timer--.

Signed and Sealed this

Eighteenth Day of October, 1994

Attest:

BRUCE LEHMAN

*Attesting Officer*      *Commissioner of Patents and Trademarks*